Nov. 1, 1927.

E. WILDHABER

GEAR

Original Filed May 11, 1925     4 Sheets-Sheet 1

1,647,167

INVENTOR
Ernest Wildhaber
BY
ATTORNEY

Nov. 1, 1927.                                                1,647,167
E. WILDHABER
GEAR
Original Filed May 11, 1925    4 Sheets-Sheet 2

INVENTOR
*Ernest Wildhaber*
BY
ATTORNEY

INVENTOR
Ernest Wildhaber
ATTORNEY

INVENTOR
Ernest Wildhaber
BY
ATTORNEY

Patented Nov. 1, 1927.

1,647,167

UNITED STATES PATENT OFFICE.

ERNEST WILDHABER, OF ROCHESTER, NEW YORK, ASSIGNOR TO GLEASON WORKS, OF ROCHESTER, NEW YORK, A CORPORATION OF NEW YORK.

GEAR.

Original application filed May 11, 1925, Serial No. 29,553. Divided and this application filed March 4, 1926. Serial No. 92,168.

The present invention relates to gears and in particular to gears which operate with axes non-intersecting and non-parallel.

One object of the present invention is to provide a pair of gears, having axes non-intersecting and non-parallel, which shall have improved efficiency and improved tooth contact.

A further object of this invention is to provide gears of this type with teeth of such shape that they may be accurately finished and readily ground.

Other objects are to provide a pair of gears, having axes non-intersecting and non-parallel, which is capable of accurate and rapid manufacture, which will be quiet in operation, which will wear evenly and which will have a high ratio of efficiency.

Other objects of the invention will appear in the course of the specification and from the appended claims.

With the above and other objects in view, my invention resides in the various novel features peculiar to the new type of gears and which are described in the specification, illustrated in the accompanying drawings and set forth in the claims appended hereto.

This application is a division of my co-pending application Serial No. 29,553, filed May 11, 1925.

Figure 1:
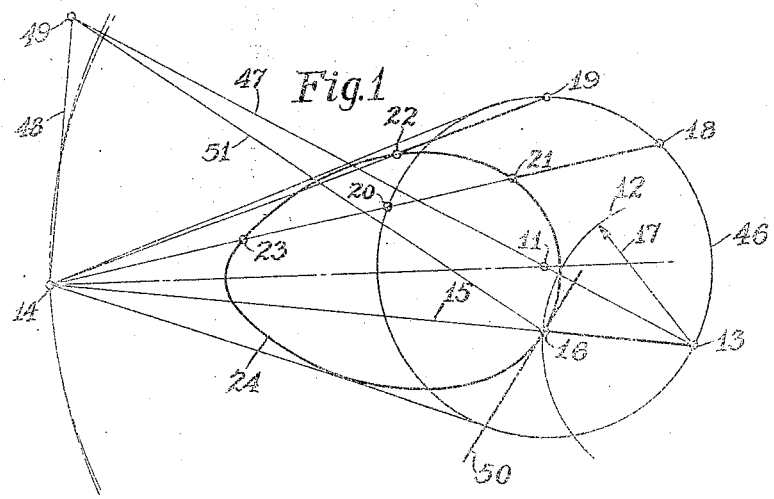
Figs. 1 and 2 are diagrammatic views, illustrative of the theory upon which the determination of the proportions of the new gears is based.

Hypoid or hyperboloidal gears are gears which are adapted to mesh with their axes non-intersecting and non-parallel and in which at least one member of the pair is provided with teeth on a side face. One or both members of a pair of such gears is or are cut from a conical or crown blank. These gears have a zone of action which is outside the shortest connecting line between their axes. While gears of this type, as heretofore produced, have had the advantage that the axes of the driving and driven member might be offset one from the other, to permit of drives not possible with bevel gears, this advantage has been offset in gear pairs of this type as heretofore produced by the noise of the gears in operation, the general weakness of the smaller member of the pair, and the difficulty experienced in manufacturing them.

The present invention aims to overcome the difficulties heretofore encountered in the design and production of hypoid gears, as well as to provide a superior tooth form. According to this invention, gears of such proportions are provided, that the teeth have a gradual mesh and contact along the entire tooth surface of one member of the pair. The teeth of the pinion will match the tooth spaces of the gear substantially along their entire length and the teeth of gear and pinion will slide endwise upon one another in mesh. The combined rolling and sliding action of the new gears, as contrasted with the pure rolling action of bevel gears which tends to squeeze the oil film away from the contacting surfaces, tends to distribute the oil film over the whole of the contacting surfaces and thus to prolong the life of the gears. These gears necessarily have teeth of maximum strength, the teeth being as thick along the whole tooth space as the mating tooth space is wide. Their construction insures long wear also, as a maximum active tooth surface is obtained and as the mesh extends along the whole length of the teeth. Because of the sliding action of the gears, they are quiet in operation. This sliding action has the effect also of preserving the desired tooth shape of the gears throughout their life. Gears constructed according to this invention, hence, are quiet in operation, of maximum strength and of long life.

The present invention has for its object particularly the production of pairs of gears, in which the pinion or smaller member is provided with teeth whose inclination angle is greater than that of the teeth of the other member. In gears of this type, the diameter or strength of the pinion is increased as compared with a bevel pinion which meshes with a gear of the same diameter and at the same ratio.

Gears formed according to this invention can be readily produced and both members may be readily ground if desired. They have the advantage of increased efficiency over worm gears and of a considerable reduction in thrusts.

The steps followed in determining what the proportions of hypoid gears should be, in order that their teeth have a gradual mesh and contact along their entire length will now be disclosed.

It was first realized, that the desired mesh and contact could be obtained if the gears were so proportioned that their mesh would extend in the general direction of the pinion axis and that this would be the case when the projection of the pinion axis into a plane tangent to the pitch surfaces of both gears at a mean contact point was tangent to the line of action between the two gears. The next step was to determine how to locate the line of action between a pair of hypoid gears. Then it was necessary to determine how to locate a tangent to the line of action without first determining the line of action. The final step was to assume the projected pinion axis as tangent to the line of action and, from the data secured in the first two steps, determine the proportions of the two gears.

Figure 2:
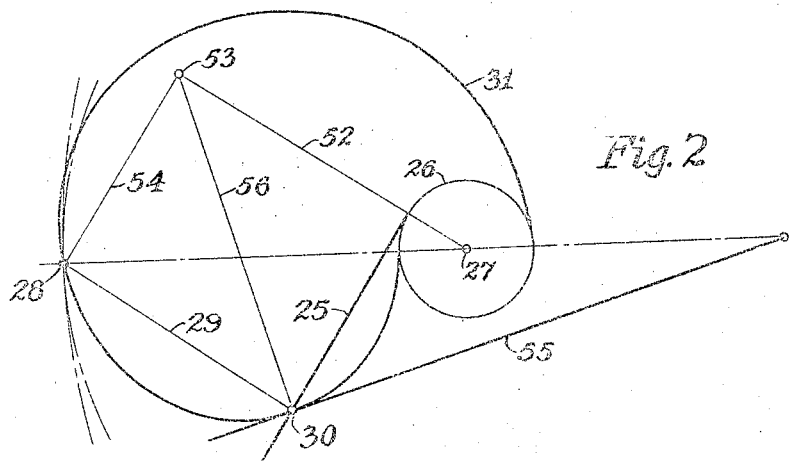
Figure 3:
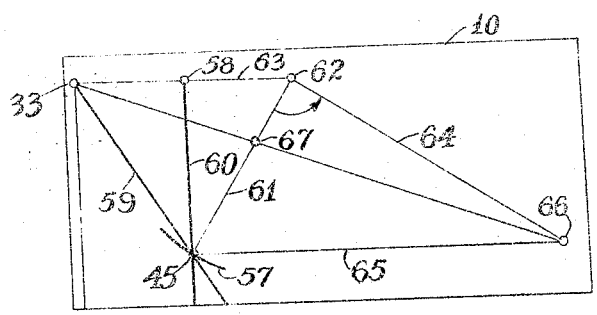
Fig. 3 is a diagrammatic view showing the development of a pair of gears, constructed according to this invention, in a plane tangent to their respective pitch surfaces at a common contact point.
Figure 4:
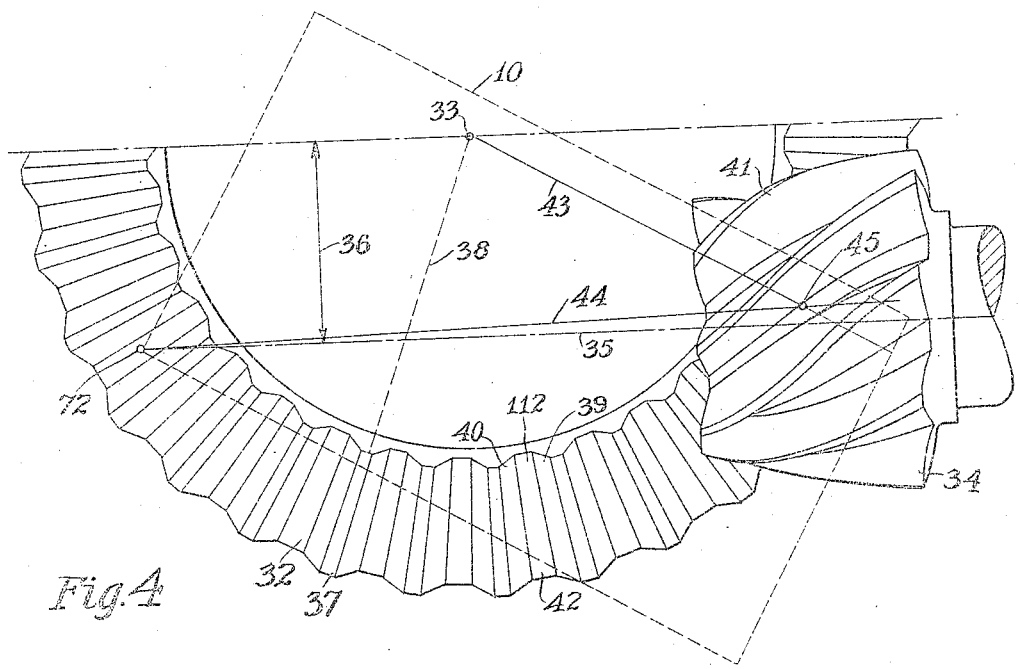
Fig. 4 is a plan view of a pair of gears constructed according to one embodiment of my invention.

Figs. 1, 2 and 3 illustrate diagrammatically the method of determining the location of the line of action between hypoid gears, the method of determining the location of a tangent to the line of action without first determining the line of action, and the method of determining the proportions of the gear pair given the projected pinion axis tangent to the line of action. Referring to Figs. 1 and 2, the plane of the drawing represents a plane tangent to the pitch surfaces of a pair of hypoid gears. This plane is shown in Fig. 4 in dotted lines where it is indicated by the numeral 10.

In development, pitch lines necessarily mesh like ordinary tooth profiles and are subject to the known requirements of tooth profiles. We can assume the location of the center or apex of one of the developed gears and also the longitudinal tooth curvature or longitudinal tooth profile of the gear. For a straight tooth gear the center of this longitudinal tooth curve or profile will be at infinity. To assist in the solution of our problem, I have preferred to choose a longitudinal tooth curve or profile having a center at a finite distance and for convenience I have selected as the longitudinal tooth curve or profile of the gear a circular arc 12 having its center at 13. We can now determine the line of action between a gear having its apex at 11 and a mate gear whose teeth are curved longitudinally so as to mate with the longitudinal tooth curves or profiles 12 of the gear whose apex is at 11 and which is so turned in timed relation with the first gear that the rolling circles or pitch circles of the two bodies contact in a point 14. It is not necessary to illustrate the mate gear or its longitudinal tooth curves or profiles, as the data which we require can be readily determined from the point of contact of the pitch circles of the two gears. This point 14, which may be called the pitch point, is the only point required with respect to the mate profile for determining the line of action. The point 14 has, in the present instance, been assumed outside the longitudinal tooth curve or profile, because, thereby, a general solution of the problem, viz, to locate the line of action of a pair of hypoid gears, may be obtained. It will be understood, however, that the point 14 might have been selected on the tooth profile without effecting our problem or its solution.

As is well known a point of contact between mate longitudinal tooth curves or profiles may be located by drawing from the pitch point a perpendicular to the longitudinal tooth curve or profile. The intersection point between the perpendicular 15, drawn from the pitch point 14, and the profile 12 is, therefore, a point of contact between the mate longitudinal tooth curves or profiles and hence a point of the line of action. In the present case, the perpendicular 15 is the connecting line between the pitch point 14 and the center 13 of the profile 12.

The contact point 16 is determined by plotting the radius 17 of the longitudinal tooth curve or profile 12 on the perpendicular 15. When this determination is repeated for the various positions 18, 19, 20, etc. of the center of longitudinal tooth curvature 13, during the rotation of the mating gears, other points 21, 22, 23, etc. of the line of action may be located. The line of action is found to be an oval curve 24.

In Figure 1 the radius 17 has been plotted inwardly of the center of longitudinal tooth curvature 13. It might, without affecting our solution, have been plotted outwardly on the perpendicular 15.

Fig. 2 is a diagrammatic view, corresponding to Fig. 1, in which the line of action has been determined for a pair of hypoid gears one of which has straight teeth, to which, in particular, the present application has reference. In Fig. 2, the longitudinal tooth curve or profile is taken at 25. Its center will be at infinity. As illustrated, the profile 25 is tangent to a circle 26 whose center is at 27, the center or apex of the gear. In other words, in this case, the teeth of the gear will be non-radial or skew. 28 is the pitch point corresponding to the point 14 of Fig. 1. The line of action is again determined by drawing perpendiculars 29 through the pitch point 28 and locating the intersection points 30. The line of action is found to be a curve 31 which approaches the form of a circular arc. It would be exactly a circular arc if the longitudinal curve or profile 25 passed through the center 27 of the gear, that is, if the teeth of the gear were radial.

Figure 5:
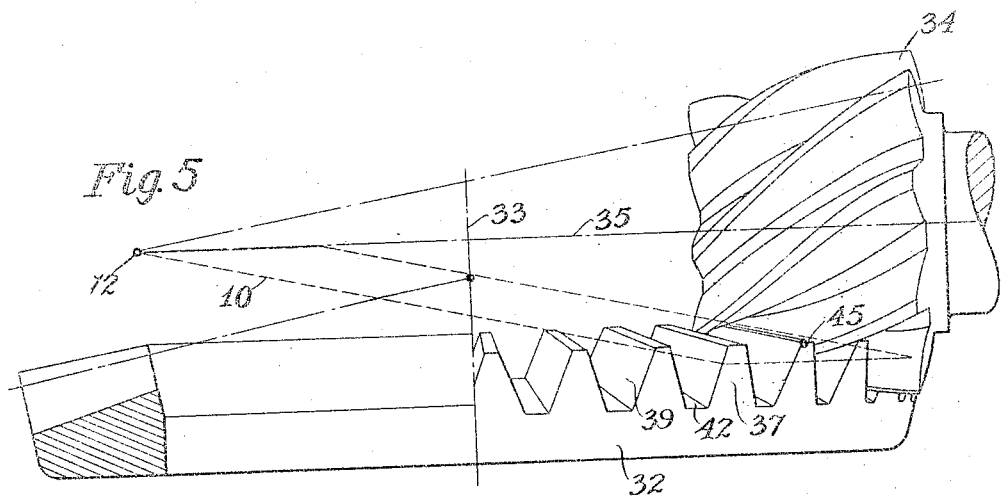
Fig. 5 is a side elevational view, partly in section, of the pair of gears shown in Fig. 4.

As before stated, the distinguishing feature of my invention is the proportioning of the mating gears so that they contact along the entire tooth surface of one member of the pair. Referring now to Figs. 4 and 5, it will be seen that in order to have the mesh extend along the entire tooth surface of one member of the pair, the line of action should extend in the general direction of the pinion axis. In these figures, where I have illustrated one embodiment of my invention, a pair of gears is shown, consisting of a gear 32 rotatable about an axis 33 and of a pinion 34 which turns on an axis 35. The axes 33 and 35 are non-intersecting and angularly disposed, the shown angle between the axes being a right angle. The shortest distance 36 between the two axes, or the amount of offset of the two gears, will be smaller than the outside radius of the larger gear of the pair. The gears are so disposed relatively to each other that the pinion lies wholly on one side of a line drawn perpendicular to the axes of the two gears.

The gear 32 is provided with teeth 37 which extend along radial lines 38. The sides 39 and 40 of the teeth are flat surfaces or planes. The sides of the teeth of the gear, therefore, are of constant profile. The teeth 41 of the pinion 34 are so constructed as to match the tooth spaces 42 of the gear.

As already stated, it can be shown readily and it is apparent from Figs. 4 and 5 that if the mesh between the two gears is made to extend in the general direction of the pinion axis the line of action will be along the entire tooth surface of one member of the pair. The line of action should, therefore, extend along the axis of the pinion projected into a plane tangent to the pitch surfaces of gear and pinion. The gears will mesh along a line of action which extends substantially along the projected pinion axis, when the projected pinion axis is tangent to the line of action in a mean contact point.

In order, therefore, to determine the proportions necessary for the two mating gears, to secure the desired mesh, we shall consider their mesh in a plane 10 tangent to their pitch surfaces. In this plane, the projected axis of the gear is indicated at 43 (Fig. 4) and the projected axis of the pinion at 44. The projected axes intersect in this plane at the mean or common contact point 45.

Referring now to Fig. 1, it will be noted that the line of action 24 can be considered the path of a point 16 on a straight line 15 whose one end 13 moves on a circle 46 and whose other end slides on the point 14. The instantaneous axis of the straight line 15 is, therefore, on a radius 47 which passes through the center 13 of the profile 12 and the center 11 of the gear, and on a perpendicular 48 to the line 15 at the point 14. In other words an infinitesimal portion of the motion of the straight line 15 equals a small turning motion about the point 49 which is the intersection point of the lines 47 and 48. In this motion every point of the line 15 travels perpendicularly to a radius between such point and the point 49. Hence it follows that the tangent 50 to the line of action 24 at the point 16 is perpendicular to the line 51 drawn radially from the instantaneous axis 49 to said point 16. The tangent 50 may, therefore, be located as follows: The radius 47 is intersected with a perpendicular 48 to the straight line 15 at 14. The tangent 50 is drawn through the point 16 at right angles to the line 51 connecting the points 49 and 16. This enables us to determine the location of a tangent to the line of action without first determining that line of action. The next step in the solution of our problem requires the selection of the projected pinion axis in the plane 10 as a tangent to the line of action. From this, the proportions of the two gears may be determined without first determining the line of action. This step will be considered hereinafter.

As already noted, the solution obtained from Fig. 1 is based on the choice of a profile 12 which, for the sake of convenience, has a center at a finite distance. That the data obtained from Fig. 1 is equally applicable, however, to longitudinal tooth curves or profiles 25 which are straight is clear from a consideration of the diagram of Fig. 2.

In Fig. 2, as already stated, the longitudinal tooth curve or profile 25 has a center at infinity. The connecting line 52 between the center 27 of the gear and the center of the profile 25 is, therefore, perpendicular to the line 25. Hence the instantaneous axis 53, which corresponds to the point 49 of Fig. 1, is found by drawing line 52 perpendicular to profile 25 and intersecting this line with a perpendicular 54 to the tooth normal 29 at the pitch point 28. The tangent 55, at the point of contact 30, is at right angles to the line 56 connecting the points 53 and 30.

In Fig. 3, the pitch surfaces of the mating gears have been developed into the tangent plane 10. The pinion axis projected into this plane is assumed tangent to the line of action between the two gears. Under this condition, we know the desired mesh will be obtained. What remains to be determined, is how to determine the proportions of hypoid gears under this condition so that we can construct such gears. Given the projected pinion axis tangent to the line of action, we can assume, either the radius of the longitudinal tooth curves or profiles of the gear or the distance of the pinion apex from the mean contact point 45, or any other equivalent quantity, in addition to the tooth inclination, and determine the other gear proportions.

For the purpose of ease in solution, the pitch line 57 has again been constructed so as to have a finite center. In Fig. 3, 33 is the center or apex of the gear and 59 and 60 are the projections into the plane 10 of the gear and pinion axes, respectively. If we assume the position of the pinion apex, we can determine the position of the profile center or radius of tooth curvature of the gear. Vice versa, if we assume the radius of tooth curvature we can determine the position of the pinion apex. Assuming the pinion apex at 58 and that 61 is the tooth normal at the point 45, that is a line which is perpendicular to the pitch line 57 of the gear, we can locate the center or radius of the pitch line. The intersection point 62 between the line 63 connecting the gear and pinion apexes, 33 and 58 respectively, and the tooth normal 61 is the pitch point of the pair in development. This point corresponds to the point 14 in Fig. 1. A perpendicular 64 is erected at 62, perpendicular to the tooth normal 61. The perpendicular 64 intersects the line 65 drawn through the point 45 perpendicular to the projected pinion axis 60 in the instantaneous axis 66. This point 66 corresponds to the point 49 of Fig. 1. From Figs. 1 and 2 we know that the connecting line between this point 66 and the gear center or apex 33 will intersect the tooth normal 61 at the center 67 of the longitudinal tooth curve or profile 57 of the gear. In this way, the center of the longitudinal tooth curve or profile, that is, the radius of tooth curvature is located.

By assuming the location of the center of the longitudinal tooth curve or profile 67, on the other hand, we can determine from the data of Fig. 3, if desired, the location of the pinion apex 58.

Any further data with respect to the offset of the gear and pinion axes can be determined mathematically or graphically from Figure 3.

To determine the cone angles of the pair, let $a'$ be the cone angle of the gear and $a''$ be the cone angle of the pinion, $N'$ and $N''$ be the tooth numbers of gear and pinion respectively. In development the pitch surface of a gear will not occupy a full circumference. The tooth number of the full circumference, in development, bears the same relation to the actual tooth number $N'$ or $N''$ as the tooth number of a crown gear is to the tooth number of a bevel gear. Hence the tooth numbers of the full circumference, in development, of gear and pinion respectively, are.

$$\frac{N'}{\sin a'} \text{ and } \frac{N''}{\sin a''}$$

The ratio of gear and pinion tooth numbers in development equals the ratio of the distances of the respective centers 33 and 58 from the pitch point 62. This known ratio is called A. Hence:

$$\frac{N'}{\sin a'} : \frac{N''}{\sin a''} = A \text{ or } \frac{N'}{N''} \cdot \frac{\sin a''}{\sin a'} = A \quad (1)$$

A further requirement is, that the axes of the pair, which are projected into lines 59 and 60, respectively, are at a given angle to each other, which is preferably a right angle. The arrangement of the gears with axes at right angles can be expressed by the formula:

$$\tan a' \times \tan a'' = \cos b, \quad (2)$$

where $b$ is the angle included between the projected axes 59 and 60.

These two equations furnish the following solution:

$$\sin^2 a'' = \sqrt{\frac{C_1^2}{4} + C_2} - \frac{C_1}{2} \quad (3)$$

where:

$$C_1 = \cotan^2 b \times \left[\left(\frac{N''}{N'}\right)^2 A^2 + 1\right]$$

$$C_2 = \cotan^2 b \times \left[\left(\frac{N''}{N'}\right)^2 A^2\right].$$

The cone angle $a''$ can be determined from equation (3), while the cone angle $a'$ can be determined from either equation (1) or (2).

From the plane of Figure 3 and from the above formulas the data for a pair of gears may be determined in such manner that the mesh between the same extends along the whole length of the gear teeth. This mesh will extend also over the whole or a large portion of the length of the pinion teeth. The gears moreover will be capable of sliding while in mesh, as required, and the teeth of one will match the tooth spaces of the other.

Figure 6:
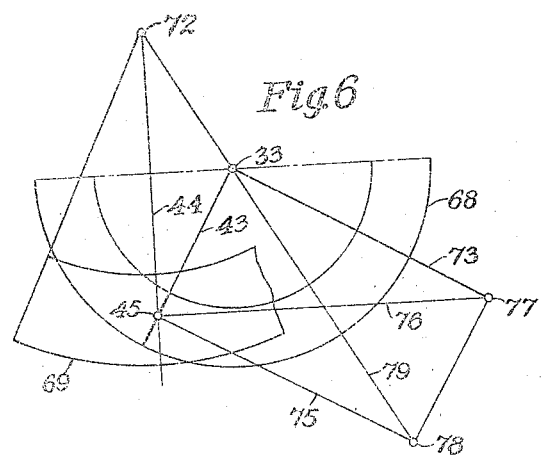
Figs. 6 and 7 are diagrammatic views, similar to Fig. 3, showing the developed pitch surfaces of gears constructed according to two different embodiments of my invention. (These views are taken in a plane corresponding to the plane of Fig. 3.)
Figure 7:
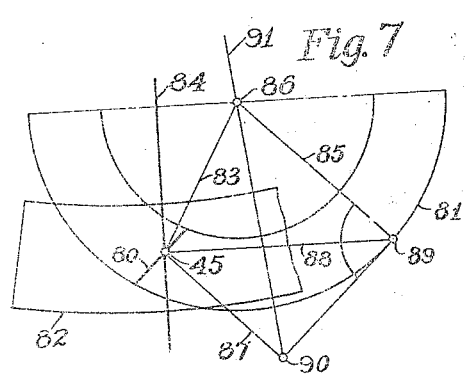

Figures 6 and 7 show diagrammatically two embodiments of my invention in which the gear has straight teeth or teeth whose longitudinal profile centers are at infinity, and they illustrate the manner in which the proportions of a straight tooth pair, whose line of mesh extends substantially along the projection of the pinion axis in the tangent plane, may be determined. Fig. 6 shows diagrammatically a pair such as illustrated in Figs. 4 and 5, in which the larger member is provided with straight radial teeth. Fig. 7 shows the development of a pair in which the teeth of the gear are non-radial or skew.

Referring to Figure 6, 68 and 69 are respectively parts of the developed pitch cones of the gears 32 and 34, respectively. The projected axes are indicated at 43 and 44. In order to locate the apex 72 of the pinion the line 73 is drawn through the gear apex 33 parallel to the normal 75. This line intersects line 76, which is drawn perpendicular to the projected pinion axis, at the common contact point 45, in a point 77. The projection of this point 77 onto the normal 75 furnishes the pitch point 78. The apex of the pinion is located at the intersection of the line 79 drawn from the pitch point 78 and passing through the gear apex 33, with the projected pinion axis.

In Figure 7, the gear is provided with teeth 80 which are non-radial or skew. 81 and 82 are parts of the developed pitch surfaces of gear and pinion respectively. 83 and 84 represent the projected axes. Line 85 drawn through the gear apex 86 parallel to the tooth normal 87 intersects line 88 drawn perpendicular to the projected pinion axis 84, at the common contact point 45, in the point 89. The projection of this point 89 onto the tooth normal 87 is the pitch point 90. The apex of the pinion may be located by drawing a line 91 from the pitch point 90 through the gear apex 86 to the intersection of this line 91 with the projected pinion axis 84.

Figure 8:
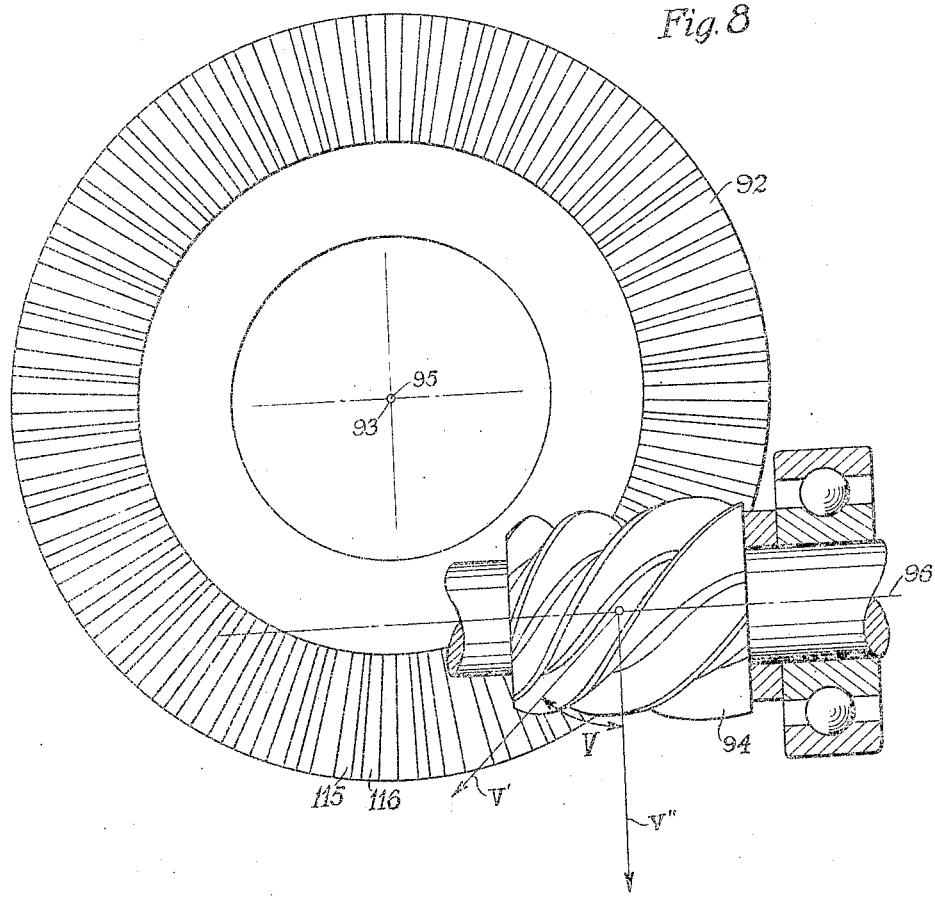
Fig. 8 is a plan view of a pair of gears constructed according to another embodiment of my invention.
Figure 9:
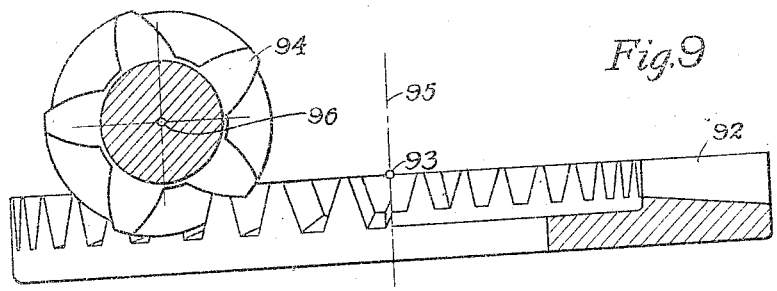
Fig. 9 is an end elevation, partly in section, of the pair shown in Fig. 8.

Figures 8 and 9 illustrate a further embodiment of my invention in which the gear is a crown gear 92, having its pitch surface in a plane and having plane tooth sides 115 and 116 of constant profile extending radially of its center or apex 93. The pinion is constructed so as to be conjugate to the gear. This pinion 94 is a cylindrical worm. The axes of gear and pinion are at 95 and 96, respectively. This particular type of gear has a much better efficiency than worm gears. The pinion or worm is so disposed relatively to the crown gear that it lies wholly on one side of a line perpendicular to its axis and the crown gear axis. The peripheral velocities of the two members, in the zone of contact, are at acute angles to one another, the angle V constituted by the peripheral velocities $v'$ and $v''$ being an acute angle. In worm drives this angle would be a right angle. These gears have the additional advantages of the new type of hypoid gears, in that the tooth contact is superior and more intimate and in that the lines of action are more inclined to the direction of sliding. Both these factors are assets of strength, long wear, and perfect lubrication.

Figure 10:
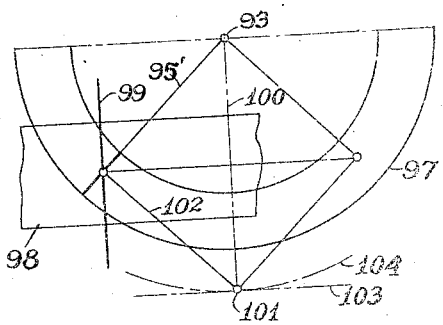
Fig. 10 is a diagrammatic view, similar to Fig. 3, and showing the development of the pair shown in Figs. 8 and 9.

Figure 10 illustrates diagrammatically the mesh of the gears shown in Figures 8 and 9. This figure, like Figures 3, 6 and 7 is a development in a plane tangent to the pitch surfaces of the two gears at a common contact point. In this figure 97 and 98 are parts of the developed pitch surface of gear and pinion respectively. 95' is the axis of the gear, 99 the projected pinion axis. As has been determined above, the line 100 connecting the pitch point 101 with the center 93 of the gear intersects the projected pinion axis 99 in its apex. When the pinion is cylindrical the line 100 will intersect the line 99 at infinity, that is the line 100 will be parallel to the line 99. The pitch point 101 is located, in a manner similar to that described for the embodiments of Figures 6 and 7, by intersecting the tooth normal 102 with the line 100.

It should be noted with respect to the gears just described, that their developed pitch surfaces mesh like rack and gear having a pitch line 103 and a pitch circle 104, respectively which contact at the pitch point 101. The circular pitch of the pinion equals the circular pitch of the gear at circle 104.

The gears which form the subject of this invention may be produced in any convenient manner. Preferably the gear or larger member of the pair is produced by causing a cutting edge to sweep across the face of the gear in such manner as to provide teeth whose side faces are of constant profile. The gear blank will be held stationary and the tool moved in the desired direction with reference to the gear apex. This direction will be radial in the case of the gear 32 or 92, and non-radial in the case of the gear illustrated diagrammatically at 81 in Figure 7. The tooth surfaces of the pinion will preferably be formed by moving a cutting edge, representing a tooth of the gear, through the pinion blank, that is across the face thereof, while imparting a relative rolling motion between the tool and blank in the manner of a pinion rolling with its mate gear with its axis offset from the axis of the mate gear.

Figure 11:
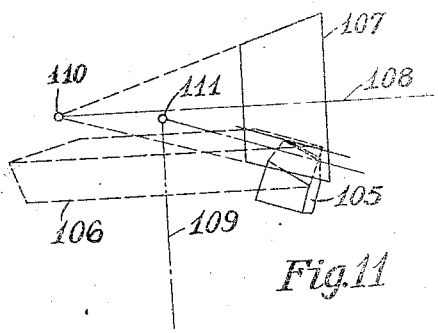
Fig. 11 is a view showing diagrammatically the method by which a pinion may be produced according to this invention.

The method for producing the pinion is illustrated diagrammatically in Figure 11 where 105 represents a tool having an effective cutting portion representing the gear, shown in broken lines at 106, and where the pinion 107 is rotated about its axis 108 and simultaneously moved, relatively to the tool, about the axis 109 of the gear while its apex 110 is maintained offset from the apex 111 of the gear. The amount of offset is determined by the method already described.

If desired the tooth spaces of the gear may be provided with bottoms, indicated at 112 in Figure 4, which are of constant width, so that both sides 39 and 40 of a tooth space may be cut simultaneously without resorting to special machinery.

By the method described, it will be seen that the gear or larger member of the pair is non-generated and that the tooth surfaces of the pinion are molded generated in a process in which the pinion blank is rolled on the gear while its axis is maintained in proper offset relation of the gear axis.

Figure 12:
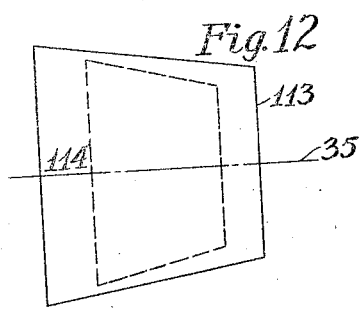
Fig. 12 is a diagrammatic view showing by way of comparison a bevel pinion of the known type and a pinion constructed according to this invention.

One feature of a pair produced according to my invention is the added strength of the pinion, for the same ratio, over the usual bevel pinion. This increase in strength is illustrated diagrammatically in Figure 12, where 113 is the outline of a pinion produced according to the present invention and 114 the outline of a corresponding bevel pinion. The diameter of the pinion may be made the larger, the more its teeth are inclined to the generatrices of its pitch surface.

While my invention consists primarily in proportioning a hypoid pair so that their tooth surfaces will contact along their entire length with the tooth spaces of one member matching the teeth of the other member along the whole length of the tooth spaces, it will be understood, that slight departures may be made from ideal conditions, as is common in gear practice, where desired, so that the pair may have some degree of adjustment or to localize the tooth bearings and that the present application is intended to cover such departures.

In general it may be said that while I have illustrated certain preferred embodiments of my invention, it will be understood that this invention is capable of further modification within the limits of the disclosure and the scope of the appended claims and that this application is intended to cover any variations, uses, or adaptations of my invention, following, in general, the principles of the invention and including such departures from the present disclosure as come within known or customary practice in gear cutting and may be applied to the essential features hereinbefore set forth and as fall within the limits of the appended claims.

Having thus described my invention, what I claim is:

1. A pair of hypoid-gears, one of which is provided with straight teeth, whose cone angles, the ratio of whose tooth numbers and whose offset are so proportioned as to secure contact along the entire length of the side tooth surfaces of one of the gears.

2. A pair of hypoid-gears, the larger of which is provided with radially extending teeth, and the smaller of which has longitudinally inclined teeth.

3. A pair of hypoid-gears, one of which is provided with radially extending teeth whose side surfaces are planes.

4. A pair of hypoid-gears, the larger of which is provided with radially extending teeth whose side surfaces are planes and the other of which is provided with longitudinally inclined teeth whose tooth surfaces are molded-generated and conjugate to the tooth surfaces of the first gear.

5. A pair of hypoid-gears so proportioned that their line of mesh extends substantially along the projection of the axis of one of the gears into a plane tangent to the pitch surfaces of both at a mean contact point.

6. A pair of hypoid-gears so proportioned that their line of mesh extends substantially along the projection of the axis of one of the gears into a plane tangent to the pitch surfaces of both at a mean contact point, the inclination angle of the teeth of the smaller member of the pair being larger than the inclination angle of the teeth of the larger member.

7. A pair of hypoid-gears, one of which is provided with side tooth surfaces which lie in planes, said gears being constructed to mesh along a line of action tangent to the projected axis of one of the gears in a plane tangent to the pitch surfaces of both.

8. A pair of hypoid-gears so proportioned that their line of mesh extends substantially along the projection of the axis of one of the gears into a plane tangent to the pitch surfaces of both at a mean contact point, one of said gears being provided with longitudinally straight teeth.

9. A pair of hypoid-gears so proportioned that their line of mesh extends substantially along the projection of the axis of one of the gears into a plane tangent to the pitch surfaces of both at a mean contact point, one of said gears being provided with straight teeth whose side surfaces are planes.

10. A pair of hypoid-gears so proportioned that their line of mesh extends substantially along the projection of the axis of one of the gears into a plane tangent to the pitch surfaces of both at a mean contact point, one of said gears being provided with radially extending teeth.

11. A pair of hypoid-gears so proportioned that their line of mesh extends substantially along the projection of the axis of one of the gears into a plane tangent to the pitch surfaces of both at a mean contact point, one of said gears being provided with radially extending teeth whose side surfaces are planes.

12. A pair of hypoid-gears so proportioned that their line of mesh extends substantially along the projection of the axis of one of the gears into a plane tangent to the pitch surfaces of both at a mean contact point, one of said gears being provided with side tooth surfaces which are conjugate to plane tooth surfaces.

13. A pair of hypoid-gears so proportioned that the tooth spaces of one of said gears are substantially as wide along the whole tooth space as the teeth of the mating gear are thick, one of said gears being provided with tooth surfaces which are conjugate to plane side tooth surfaces.

14. A pair of hypoid-gears so proportioned that they contact substantially along the entire length of the tooth surface of one gear, one of said gears being provided with tooth surfaces which are conjugate to plane side tooth surfaces.

15. A pair of hypoid-gears so proportioned that their line of mesh extends substantially along the projection of the axis of one of the gears into a plane tangent to the pitch surfaces of both at a mean contact point, one of said gears being provided with radially extending teeth whose side tooth surfaces are of constant profile along their entire length and the other of said gears having teeth conjugate to those of the first gear and molded generated.

16. A pair of hypoid-gears so proportioned that the tooth spaces of one of said gears are substantially as wide along each tooth space as the teeth of the mating gear are thick, one of said gears being provided with radially extending teeth whose side tooth surfaces are of constant profile along their length and the other gear having teeth conjugate to those of the first gear and molded generated.

17. A pair of hypoid-gears so proportioned that they contact along the entire length of the side tooth surface of one gear of the pair, one of said gears being provided with radially extending teeth whose side tooth surfaces are of constant profile along their length and the other gear having teeth conjugate to those of the first gear and molded generated.

18. A pair of hypoid-gears so proportioned that the tooth spaces of one of said gears are substantially as wide along each tooth space as the teeth of the mating gear are thick, one of said gears being provided with radially extending teeth.

19. A pair of hypoid-gears so proportioned that they contact substantially along the entire length of the side tooth surface of one gear, one of said gears being provided with longitudinally straight teeth.

20. A pair of hypoid-gears so proportioned that they contact substantially along the entire length of the side tooth surface of one gear, one of said gears being provided with radially extending teeth.

21. A pair of hypoid-gears so proportioned that the tooth spaces of one of said gears are substantially as wide along the tooth space as the teeth of the mating gear are thick, one of said gears being provided with longitudinally straight teeth.

22. A pair of hypoid-gears so proportioned that they contact substantially along the entire tooth surface of one member of the pair, one of said gears having teeth whose side surfaces are planes and the other of said gears having teeth conjugate to those of the first gear and molded generated.

23. A pair of hypoid-gears so proportioned that the tooth spaces of one of said gears are substantially as wide along the whole tooth space as the teeth of the mating gear are thick, one of said gears having teeth whose side surfaces are planes and the other of said gears having teeth conjugate to those of the first gear and molded generated.

24. A pair of hypoid-gears so proportioned as to mesh substantially along the projection of the axis of one of the gears into a plane tangent to the pitch surfaces of both at a mean contact point, one of said gears being provided with teeth of molded generated profile.

25. A pair of hypoid-gears so proportioned that the tooth spaces of one of said gears are substantially as wide along the whole tooth space as the teeth of the mating gear are thick, one of said gears being provided with teeth of molded generated profile.

26. A pair of hypoid-gears so proportioned as to mesh substantially along the projection of the axis of one of said gears into a plane tangent to the pitch surfaces of both at a mean contact point, one of said gears having side tooth surfaces conjugate to plane surfaces, the profiles of said gear teeth being molded generated.

27. A pair of hypoid-gears so proportioned that the tooth spaces of one of said gears are substantially as wide along the whole tooth space as the teeth of the mating gear are thick, one of said gears having side tooth surfaces which are molded generated and conjugate to plane surfaces.

28. A pair of hypoid-gears so proportioned that they contact along the entire length of the side tooth surface of one gear, one of said gears having tooth surfaces which are molded generated and conjugate to plane surfaces.

29. A pair of hypoid-gears so proportioned as to mesh along a line of action tangent to the projected axis of one gear in a plane tangent to the pitch surfaces of both at a mean contact point, one of said gears having teeth whose surfaces are of constant profile and the other of said gears being conjugate to the first gear and molded generated.

30. A pair of hypoid-gears so constructed as to contact along the entire length of the side tooth surface of one gear, one of said gears having teeth of molded generated profile.

31. A pair of hypoid-gears so proportioned as to contact along the length of the side tooth surface of one gear and so constructed also that the inclination angle of the teeth of the smaller member of the pair is larger than that of the larger member of the pair, said smaller member having molded generated tooth surfaces.

32. A pair of gears arranged with axes non-intersecting and non-parallel one of which is a crown gear having radially extending teeth whose side tooth surfaces are planes, and the other of which is a gear having teeth conjugate to those of the crown gear and molded generated.

33. A pair of gears arranged with axes non-intersecting and non-parallel one of which is a crown gear, one of said gears having teeth whose side surfaces are of constant profile and the other of said gears having teeth conjugate to the first gear and molded generated.

34. A pair of hypoid-gears so proportioned that in a plane tangent at a common point of contact to the pitch surfaces of both, a line passing through the projection of the apex of the gear and drawn from the intersection point of a normal to the gear tooth with a line perpendicular to said normal drawn from the intersection point of a perpendicular to the projected pinion axis at the common contact point and a line drawn from the projection of the apex of the gear passing through the projection of the center of the longitudinal tooth curvature, intersects the projected pinion axis at its apex.

35. A pair of hypoid-gears so constructed that in a plane tangent to the pitch surfaces of both at a point midway the length of the contacting tooth surfaces, their ratio is proportional to the distances of the projections of the respective apexes of the two gears from the intersection point of a normal to the longitudinal tooth profile of one of the gears at said contact point, with a line connecting their apexes.

36. A pair of hypoid-gears whose cone angles are determined by the following formula:

$$\sin^2 a'' = \sqrt{\frac{C_1^2}{4} + C_2} - \frac{C_1}{2}$$

where $$C_1 = \cotan^2 b \left[ \left(\frac{N''}{N'}\right)^2 A^2 + 1 \right]$$

and $$C_2 = \cotan^2 b \left[ \left(\frac{N''}{N'}\right)^2 A^2 \right]$$

and where $b$ is the angle between the axes of the two gears projected into a plane tangent to their respective pitch surfaces, $N'$ and $N''$ are their respective tooth numbers and $A$ the inverse ratio of said tooth numbers in development in said plane.

37. A pair of gears arranged with axes non-intersecting and non-parallel, one of which is a crown gear having radially extending teeth, whose side surfaces are non-generated and the other of said gears having teeth conjugate to the first gear and molded generated.

38. A pair of gears arranged with axes non-intersecting and non-parallel, consisting of a crown gear having teeth whose side surfaces are non-generated and a worm having teeth conjugate to those of the crown gear, said gears being so disposed relatively to each other that the worm lies wholly on one side of a line perpendicular to the axes of the two gears.

39. A pair of gears arranged with axes non-intersecting and non-parallel consisting of a crown gear, having teeth whose side surfaces are planes, and a worm, having teeth which are molded generated and conjugate to those of the crown gear, said gears being so disposed relatively to each other that the worm lies wholly on one side of a line perpendicular to the axes of the two gears.

40. A pair of gears arranged with axes non-intersecting and non-parallel, consisting of a worm and a crown gear, having radially extending teeth, said gears being disposed relatively to each other so that the worm lies wholly on one side of a line drawn perpendicular to the axes of the two gears.

41. A pair of gears arranged with axes non-intersecting and non-parallel, consisting of a crown gear, having radially extending teeth, and a worm, having teeth conjugate to those of the crown gear and molded generated, said gears being so disposed relatively to each other that the worm lies wholly on one side of the line drawn perpendicular to the axes of the two gears.

42. A pair of gears arranged with axes non-intersecting and non-parallel, one of which is a crown gear, one of said gears having teeth whose side surfaces are non-generated, and the other of said gears having teeth conjugate to those of the first gear and molded generated, said gears being so disposed relatively to each other that the smaller member of the pair lies wholly on one side of a line drawn perpendicular to the axes of the two gears.

ERNEST WILDHABER.